Figure 1:
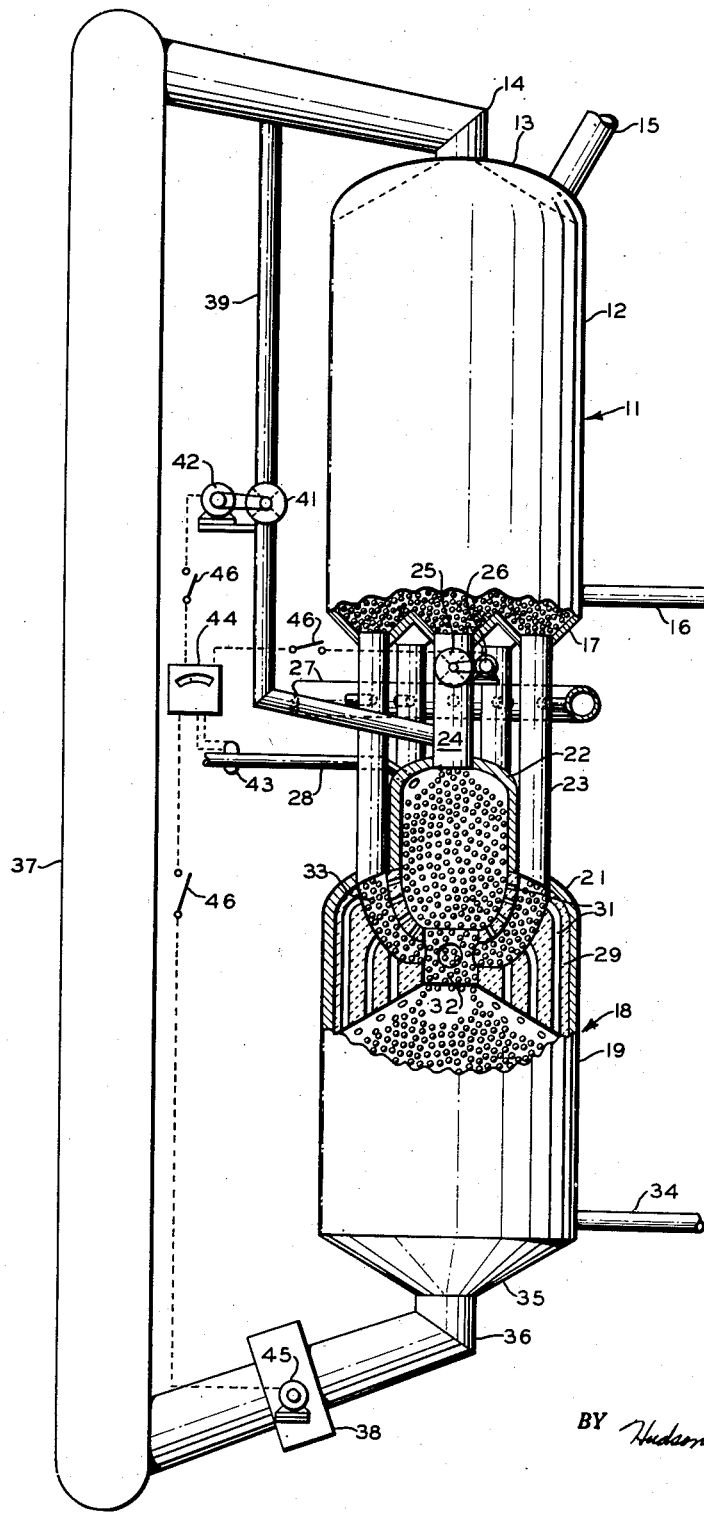

Nov. 9, 1954     H. J. HEPP     2,694,096
METHOD AND APPARATUS FOR INDEPENDENTLY CONTROLLING
REACTION TIME AND TEMPERATURE FOR
HYDROCARBON CONVERSION

Filed Sept. 12, 1949     2 Sheets-Sheet 1

INVENTOR.
H. J. HEPP
BY Hudson and Young
ATTORNEYS

Nov. 9, 1954

H. J. HEPP 2,694,096

METHOD AND APPARATUS FOR INDEPENDENTLY CONTROLLING REACTION TIME AND TEMPERATURE FOR HYDROCARBON CONVERSION

Filed Sept. 12, 1949

2 Sheets-Sheet 2

INVENTOR.
H. J. HEPP
BY Hudson and Young
ATTORNEYS

United States Patent Office 2,694,096
Patented Nov. 9, 1954

2,694,096

METHOD AND APPARATUS FOR INDEPENDENTLY CONTROLLING REACTION TIME AND TEMPERATURE FOR HYDROCARBON CONVERSION

Harold J. Hepp, Bartlesville, Okla., assignor to Phillips Petroleum Company, a corporation of Delaware Application September 12, 1949, Serial No. 115,202

9 Claims. (Cl. 260—683)

This invention relates to hydrocarbon reaction systems. In one of its more specific aspects it relates to a method for controlling reaction time and temperature in hydrocarbon reaction systems. In another of its more specific aspects it relates to improved pebble heater apparatus.

Thermal conversion processes which are carried out in so-called pebble heater apparatus utilize a flowing mass of solid heat exchange material, which mass is heated to a high temperature by passing hot gas therethrough in a first direct heat exchange step and is then caused to contact gaseous reactant materials, furnishing heat thereto in a second direct heat exchange. The conventional pebble heater apparatus generally comprises two chambers which may be disposed in substantially vertical alignment. The solid heat exchange material is introduced into the upper portion of the first or upper chamber. That material forms a moving bed of solid heat exchange material which flows downwardly through the chamber in direct heat exchange with hot gaseous heat exchange material. The solid heat exchange material is heated to a high temperature in the heat exchange and is then passed to a second chamber in which the hot solid heat exchange material is caused to contact gaseous reactant materials in a second direct heat exchange relation, furnishing heat for the treatment or conversion of the gaseous materials.

Conventional pebble heater chambers of pebble heater apparatus are generally formed as cylinders and a solid heat exchange material is passed thereinto in the form of a moving bed. Hot heat exchange gases are sometimes introduced into the upper cylindrical bed at its lower end and at the periphery of such chambers. The solid heat exchange material is drawn from a substantially central point in the bottom of the bed and is passed downwardly into a gas heating chamber where a second moving bed of solid heat exchange material is formed.

The use of pebble heater apparatus for accomplishing hydrocarbon conversions at elevated temperatures has many advantages, the most important of which is the ease with which high temperatures and short reaction times are attained. There are, however, many situations in the conversion of hydrocarbons in which the conventional pebble heater apparatus is not well adapted to providing the proper time-temperature conditions.

Conventional pebble heater reactors are rather inflexible as to the time-temperature relationship which is obtainable in any given installation. For reasons of economy and heat efficiency, it is generally desirable that pebbles which are removed from the bottom of the reaction chamber be relatively cool, i. e., at 900° F. and below, to permit the use of ordinary steel in the elevator. Such a limitation imposes a minimum ratio of hydrocarbon feed rate to pebble circulation which in turn establishes a minimum volume of hydrocarbon which can be charged as feed to the reactor. A reduction in the hydrocarbon charge from the established minimum results in excessively hot pebbles leaving the bottom of the reactor.

As a result of this situation, a very definite upper limit is imposed upon the overall time of reactant material residence in the reactor chamber under given reaction conditions. The effective time of residence, i. e., the time of residence within the reactor chamber at temperatures sufficiently high to permit the reaction to proceed at a practical rate is much shorter than the overall residence time by virtue of the heat transfer characteristics of a moving pebble bed. The heat transfer rate due to the extended surface of the pebbles is quite high, some authorities giving a value of 15,000 B. t. u./sq. ft./° F./hr. Thus, at the feed inlet where the delta T is high, rapid heating of the charge occurs. The temperature of the feed as it moves up the chamber countercurrent to the flow of pebbles downwardly therethrough rapidly approaches the pebble temperature and heat transfer becomes small. This situation exists throughout a substantial intermediate portion of the reactor chamber, there being only a slow rise in hydrocarbon temperature as it moves up the reaction chamber. It is not until the hydrocarbon approaches the top of the chamber that a substantial difference in temperature develops between the hydrocarbon and the pebbles, and a rapid rise in hydrocarbon temperature occurs. The exact temperature of the hydrocarbon material traversing the long intermediate section of the chamber is determined by pebble temperature, pebble flow rate, hydrocarbon flow rate, initial hydrocarbon temperature, and the sensible and endothermic heat picked up in the top of the reactor. In endothermic reactions, virtually all of the endothermic reaction heat plus a substantial fraction of the sensible heat is picked up in a very small top portion of the pebble bed, the region below this being below effective reaction temperature. From the above discussion, it will be apparent that the effective reaction time within a reactor chamber of pebble heater apparatus is quite short and effective reaction temperature quite high.

An object of this invention is to provide improved pebble heater apparatus. Another object of the invention is to provide an improved method for independently controlling reaction time and temperature in pebble heater type reactors. Another object of the invention is to provide an improved pebble heater reactor in which it is possible to independently control reaction time and temperature. Another object of the invention is to provide an improved method for reacting hydrocarbons. Other and further objects and advantages will be apparent to those skilled in the art upon study of the accompanying disclosure and the drawings.

Solid heat exchange material which is conventionally used in pebble heater apparatus is generally called "pebbles." The term "pebbles" as used herein denotes any solid refractory material of flowable size and form, having considerable strength and which is suitable to carry large amounts of heat from the pebble heating chamber to the gas heating chamber without rapid deterioration or substantial breaking. Pebbles conventionally used in pebble heater apparatus are substantially spherical and range from about one-eighth inch to about one inch in diameter. In a high temperature process, pebbles having a diameter between one-eighth and three-eighths inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other material having the properties above described may be utilized to form such pebbles. Silicon carbide, alumina, periclase, beryllia, stellite, zirconia, and mullite may be satisfactorily used to form such pebbles or may be used in admixture with each other or with other materials. Pebbles formed of such materials, when properly fired, serve very well in high temperatures, some withstanding temperatures up to about 3500° F. Pebbles which are used may be either inert or catalytic when used in any selected process.

Some of the difficulties of converting hydrocarbons in conventional pebble heater apparatus will be apparent upon study of the following example.

68,500 cubic feet per hour of a gas having the composition 17.8 volume per cent methane, 52.2 volume per cent ethane, and 30 volume per cent propane, was passed into the bottom portion of a reactor chamber of a pebble heater apparatus. The reactor chamber was 4½ feet in diameter and contained a pebble bed 5 feet in depth. The pressure was substantially atmospheric. Pebbles were supplied to the top of the reactor chamber at a rate of 33,000 pounds per hour and temperatures were measured at one foot intervals by use of thermocouples extending from the bottom of the chamber axially through the pebble bed. The following temperatures were obtained: At one foot above the feed inlet the temperature was 935° F.; at two feet above the feed inlet the temperature was 1215° F.; at three feet above the feed inlet the temperature was 1240° F.; and a like temperature was obtained at four feet above the feed inlet. The temperature of the gas at the reactor chamber outlet was 1480° F. The composition of the conversion products in mol per cent was determined to be hydrogen 20.3 per cent; methane 24.5 per cent; ethylene 20 per cent; ethane 23.9 per cent, propylene 2.8 per cent; propane 7.6 per cent, and $C_4$'s and higher 0.9 per cent. The pebbles which were passed into the reactor chamber dropped through about 8 cubic feet of void space in the empty chamber above the pebble bed. The temperature of the pebbles when introduced into the upper portion of the reactor chamber was about 1800° F., and the maximum gas temperature attained was somewhat above 1600° F. During the above described test run approximately 37 per cent of the ethane feed and 65 per cent of the propane feed was cracked. At the average effective temperature of 1550° F. the time required to effect the above degree of cracking is 0.19 second estimated on the basis of the ethane or 0.16 second estimated on the basis of the propane reacted. The overall residence time of the hydrocarbon, which was determined at an average temperature of 1300° F. by averaging the inlet and outlet gas volumes, was 0.58 second based on a void space in the pebble bed of 46 per cent and allowing for 8 cubic feet of empty space at the top of the bed. It was thus determined that over two-thirds of the pebble bed was below the reaction temperature.

As discussed above, reaction time in a conventional pebble heater reactor is not readily set independently of temperature because of the inter-relation of the several operating variables. There are, however, many hydrocarbon reactions in which such independent control is desirable, for example, the formation of benzene and other aromatics. It is known that a very definite relation exists between temperature and reaction time which are required to develop a maximum yield of volatile aromatic oils. For propane and butane this relationship is explained by the equation $T = 691 - 100 \log t$, where $T$ is temperature in °C. and $t$ is equal to time in minutes. In view of the overall rigidity of the conventional pebble heater, it is obvious that it would be sheerest coincidence if the conditions represented by the above equation were met. Actually, the time required by the above equation is so great as compared with time attainable in the pebble heater that it is only in the very high temperature region that there is any possibility of meeting it.

The present invention is designed generally to provide a method of independently controlling reaction time and temperature in pebble heater type reactors by introducing hot pebbles at points intermediate the ends of the reactor chamber and by controlling the volume of pebbles which is introduced at the top of the reactor chamber, thus increasing the flexibility and usefulness of pebble heater techniques.

Figure 2:
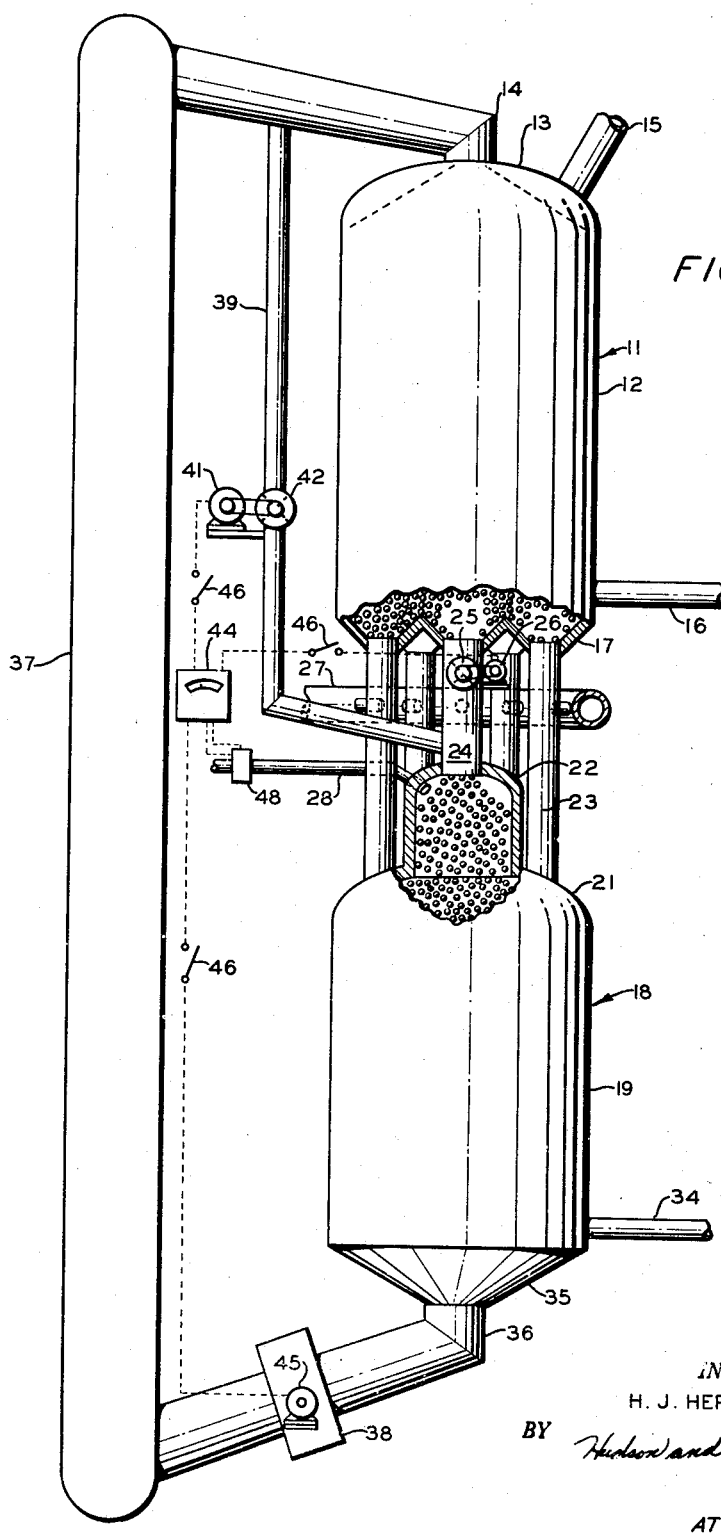

More complete understanding of the present invention by those skilled in the art will be obtained upon reference to the drawings in which Figure 1 is an elevation, in partial section, of a preferred pebble heater apparatus of this invention. Figure 2 is an elevation, partly in section, showing a modification of the pebble heater apparatus of this invention.

Referring particularly to the device set forth as Figure 1 of the drawings, pebble heater chamber 11 comprises shell 12 which is closed at its upper end by closure member 13. Pebble inlet conduit 14 and gaseous effluent outlet conduit 15 are provided in closure member 13. Heating material inlet conduit 16 is provided in the lower portion of pebble heater chamber 11. The bottom closure 17 of pebble heater chamber 11 is formed as a central inverted cone which is surrounded by a plurality of additional inverted cones. Reactor chamber 18 comprises shell 19 which is closed at its upper end by closure members 21 and 22. A plurality of pebble conduits 23 extend downwardly from the plurality of inverted cones in closure member 17 to closure member 21 in reactor chamber 18. Conduits 23 extend downwardly around the upwardly extending dome-like closure member 22. Pebble conduit 24 extends downwardly from the central inverted cone in closure member 17 to closure member 22. Pebble flow controller 25 is provided in pebble conduit 24 and drive means 26 is provided in operative communication with pebble flow controller 25. Steam conduit 27 extends between an inert gas supply source, such as a steam supply, and points in conduits 23 and 24 intermediate their ends. Gaseous effluent outlet conduit 28 extends outwardly from the upper portion of closure member 22. Pebble support member 29 is provided within reactor chamber 18 intermediate the ends of that chamber and is provided with gas passages 31 which are disposed to allow passage of gas longitudinally from the bottom to the top of reactor chamber 18. Pebble support member 29 is preferably formed as a doughnut baffle which provides a central pebble conduit 32 therein. A plurality of pebble conduits 33 extend downwardly and inwardly from pebble conduits 23 through pebble support member 29 to central conduit 32. The upper surface of support member 29 is preferably formed as an inverted cone which forms an angle of between 60° and 100°. Stagnation of pebbles on the upper surface of such a support member would thus be substantially avoided.

Reactant material inlet conduit 34 is provided in the lower portion of reactor chamber 18. Closure member 35 closes the bottom portion of reactor chamber 18 and pebble outlet conduit 36 extends from closure member 35 to the bottom portion of elevator 37. The upper portion of elevator 37 is connected to the upper end of pebble inlet conduit 14. Pebble feeder 38 is disposed in pebble outlet conduit 36 and is operatively connected to drive means 45. By-pass pebble conduit 39 extends between pebble inlet conduit 14 and pebble conduit 24. Pebble flow controller 41 is provided in conduit 39 and is operatively connected to drive means 42. Drive means 26, 42, and 45 may be conventional variable speed motors. Conversion products variable measuring means 43 comprising a light source, a photoelectric cell, forming a light absorption measurer, is provided in communication with gaseous material effluent outlet conduit 28 and is operatively connected to controller 44. Controller 44 is connected to drive means 26 and 42 and to pebble feeder drive means 45 as indicated by the dotted lines. Switch members 46 are provided in the lines connecting the drive means with controller 44. Controller 44 may operate automatically or may be provided with manual adjustment means. Controller 44 may be of a type which is commercially available, such as the "Atcotran" controller which is marketed by the Automatic Temperature Control Company.

In the operation of the device set forth as Figure 1 of the drawings, pebbles are supplied to pebble heater chamber 11 through pebble inlet conduit 14 and form a flowing contiguous pebble mass therein. Heating material, such as hot combustion gas, is injected into the lower portion of pebble heater chamber 11 through inlet conduit 16. Although inlet conduit 16 is diagrammatically shown as entering pebble heater chamber 11 at only a single point, it is within the scope of this invention that heating material may be injected into the lower portion of the pebble bed at a plurality of points. A gaseous or liquid fuel may be used instead of the hot combustion gas and injected onto the surface of the downflowing pebbles where it is burned, heating the pebbles by the heat of decomposition. Hot combustion gas resulting from the decomposition of the fuel on the pebbles or that which is supplied directly to the lower portion of pebble heater chamber 11 passes upwardly through the pebble heater chamber countercurrent to the flow of the downflowing pebbles. A first portion of the heated pebbles flow downwardly through pebble conduits 23 and 33 into the central pebble conduit formed by doughnut baffle 32 within reactor chamber 18.

A second portion of the heated pebbles passes through pebble flow controller 25 and pebble conduit 24 into the portion of reaction chamber 18 which is above pebble support member 29. The pebbles flow from the portion of the reactor chamber above pebble support member 29 downwardly through the central conduit 32 formed by the support member and mix with the pebbles flowing downwardly through conduits 33. Reactant materials are supplied to the lower portion of reactor chamber 18 and flow upwardly through the pebble bed formed in chamber 18 below pebble support member 29 in heat exchange relation therewith. As disclosed above, the reactant materials flow upwardly through a substantial intermediate portion of the pebble bed with very little increase in temperature. Reaction of the reactant material begins to take place near the upper surface of the pebble bed formed below pebble support member 29. The conversion products, together with unconverted reactant materials, flow through gas passages 31 into the pebble bed formed above pebble support member 29 where additional heat of conversion is supplied by additional heated pebbles therein. Conversion products are removed from the upper portion of reactor chamber 18 through effluent outlet conduit 28.

The comparative concentration of unsaturated material in the conversion products is determined by the measuring means 43. This type of control is particularly advantageous when normal paraffins are being converted to olefins. In such a situation when the comparative concentration of unsaturates is quite small, a considerable amount of light from the light source finds its way to the photoelectric cell which gives an impulse which is transmitted to controller 44 on which the result is indicated. When the controller is automatic, rheostat members which are integrated with the controller, vary or increase the power input to drive member 26, switch means 46 in that line being closed. Drive means 26 increases the speed of operation of flow controller 25 which adds an increased amount of hot pebbles to that portion of the reactor chamber above pebble support member 29. Such an increase in the volume of pebbles effectively increases the temperature in the upper portion of the reactor chamber. The residence time of the gas in direct contact with the hot pebbles is increased thereby although the overall residence time in the reactor chamber is decreased. In the hydrocarbon conversion processes in which high concentrations of unsaturates are not desirable or must be limited, the controller 44 may be adapted to regulate the drive means so as to effect the change in reaction time and temperature so as to beneficially affect the reaction.

Pebble feeder 38 is likewise controlled by controller 44, switch means 46 being closed, in response to the concentration of unsaturated material measured in effluent outlet conduit 28. Pebble feeder 38 may be any conventional type of feeder, such as a vibratory feeder, a star valve, or the like.

Referring particularly to Figure 2 of the drawings, like parts bear like members to those set forth in Figure 1 of the drawings. The construction of the device shown in Figure 2 of the drawings varies from that described in connection with Figure 1 in two general details. Pebble support members 29 is not provided within the reactor chamber of that apparatus. Figure 2 differs in a second detail in that measuring means 48 is a specific gravity measuring means, which replaces the measuring means 43, in communication with effluent outlet conduit 28. A thermocouple or other temperature measuring device may be substituted for measuring means 43.

The operation of the device shown as Figure 2 of the drawings is much the same as that described in connection with Figure 1. Pebbles are supplied to the upper portion of heater chamber 11 through pebble inlet conduit 14 and form a flowing contiguous mass therein. Heating material is introduced into the lower portion of the chamber and passes upwardly therethrough in heat exchange relation with the pebbles, whereby the pebbles are raised to a high temperature. A first portion of the heated pebbles flows downwardly through pebble conduits 23 into reactor chamber 18 at points intermediate its ends and form a flowing contiguous mass therein. A second portion of the heated pebbles passes through flow controller 25 and conduit 24 into the top of reactor chamber 18 and forms an additional pebble mass on top of the pebble mass originally formed in reactor 18 by pebbles flowing downwardly through pebble conduits 23.

Reactant materials are supplied to the lower portion of reactor chamber 18 through reactant material inlet conduit 34 and pass upwardly through the pebble bed therein in direct heat exchange with the pebbles. The reactant materials are preheated in the lower portion of the pebble bed and substantially reach conversion temperature at a level quite close to that at which the pebbles are introduced into chamber 18 through conduits 23. Conversion of the reactant materials begins to take place at that point and the conversion products, together with unreacted reactant materials, pass upwardly into the portion of the pebble bed which is supplied through pebble conduit 24. Conversion products are removed from the upper portion of reaction chamber 18 through effluent outlet conduit 28 and the specific gravity of the effluent is measured at specific gravity measuring means 48. The speed of operation of drive means 26 and drive means 45 is varied by controller 44 in response to variation of the specific gravity of the effluent material. Variation of the speed of operation of drive means 26 and 45 effectively varies the reaction temperature and the residence time in reactor chamber 18. When pebble feeder 38 operates to increase the flow of pebbles without a variation in speed of operation of flow controller 25 the level of pebbles above the level of outlet of conduits 23 will be diminished. An increase in the rate of operation of controller 25 without a concomitant increase in the rate of operation of feeder 38 effectively increases the level of pebbles above the level of outlet of conduits 23, thus decreasing the residence time of the gas in the reaction zone. The rate of operation of both controller 25 and feeder 38 may be increased so that the overall temperature in the reactor is increased without increasing or decreasing the residence time for the gas. In the operation of the pebble heater in this manner, it is possible to independently control the reaction time and the temperature of the pebble heater reactor.

In some reactions, such as the polymerization of olefins, the action is exothermic. In such a situation, a switch means in the line between controller 44 and drive means 26 is opened which effectively stops the flow of pebbles from pebble heater chamber 11 into the upper portion of reactor chamber 18. The hot pebbles flow downwardly into reactor chamber 18 through conduits 23 and provide sufficient heat to start the reaction within the reactor chamber. Cooler pebbles are supplied through conduit 39 to conduit 24 and thus into the upper portion of reactor chamber 18. The switch means between drive member 42 and controller 44 is closed and the flow of cooler pebbles through conduit 29 is varied in response to one of the variable phenomena of the effluent. Controller 44 may be operated in response to the temperature of the effluent if desired.

Pebbles which are removed from the bottom of reactor chamber 18 and which are fed through pebble feeder 38 are elevated by means of elevator 37 to the upper portion of pebble heater chamber 11 through pebble inlet conduit 14.

The method of operation which has heretofore been described has been limited to the specific operation of the apparatus of this invention. Many other types of apparatus may be used to perform the principles of the method which forms a part of this invention. The method itself is not restricted to the operation of the specific device shown in the drawings, although the steps of the method are performed by the specific apparatus disclosed herein. The method of this invention is readily adaptable among others to the synthesis of aromatics from gaseous or liquid charging stocks, the catalytic cracking and dehydrogenation of hydrocarbons, and the like.

Various modifications of this apparatus will be apparent to those skilled in the art upon study of the accompanying disclosure. It is believed that such modifications are within the spirit and the scope of this disclosure.

I claim:

1. An improved pebble heat exchanger which comprises in combination a first upright heat exchange chamber; a pebble inlet and an effluent outlet in the upper portion of said first heat exchange chamber; a fluid heat exchange material inlet in the lower portion of said first chamber; a second heat exchange chamber below said first heat exchange chamber; at least one first pebble conduit extending between the lower portion of said first chamber and the central top portion of said second chamber; a plurality of second pebble conduits extending between points in the lower portion of said first chamber intermediate the axis and periphery thereof and an intermediate portion of said second chamber, said second conduits being spaced about the wall of said second chamber, having outlets at their lower ends and spaced below the level of the outlet of said first pebble conduit; a fluid heat exchange material inlet in the lower portion of said second chamber; an effluent outlet in the central top portion of said second chamber; a pebble outlet in the lower portion of said second chamber; pebble elevation means extending between said pebble outlet in said second chamber and said pebble inlet in said first chamber; and pebble flow control means between the lower end of said first chamber and the upper end of said second chamber only in said first pebble conduit.

2. The pebble heat exchanger of claim 1, wherein a pebble support member extends between the walls of second chamber intermediate its ends, separating said second chamber into upper and lower chamber portions; a third pebble conduit centrally disposed in said pebble support member and connecting said upper and lower chamber portions; said plurality of second pebble conduits extending downwardly to said third pebble conduit through said pebble support member; and gaseous material conduits extending between said upper and lower chamber portion through said pebble support member.

3. The pebble heat exchanger of claim 2, wherein a fourth pebble conduit extends between the upper portion of said pebble inlet in said first chamber and said first pebble conduit.

4. The pebble heat exchanger of claim 1, wherein a third pebble conduit extends between the upper portion of said pebble inlet in said first chamber and said first pebble conduit.

5. An improved method for controlling time and temperature for conversion of hydrocarbons in a reactor of pebble heater apparatus, which comprises passing a first portion of heated solid heat exchange material into a first and upper end portion of said reactor and downwardly through the reactor; by-passing said first portion of said reactor with a second portion of said heated solid heat exchange material and passing said second portion of said heated solid heat exchange material into a second and lower end portion of said reactor, which said second portion of said reactor is of greater lateral cross section than said first portion, at points distributed about the top of said second portion of said reactor, and downwardly therethrough; passing gaseous hydrocarbon material upwardly through said second portion of said reactor, wherein said hydrocarbon material is preheated and conversion thereof is commenced; passing all of said preheated hydrocarbon material and any resulting conversion products from said second portion of said reactor through said first portion of said reactor; removing resulting conversion products from said reactor only through the upper end portion of said first portion of said reactor; and independently varying the volume of heated solid heat exchange material passed through said first portion of said reactor only so as to independently control conversion time and temperature in said first reactor portion.

6. The method of claim 5 wherein the volume of heated solid heat exchange material in said second portion of said second heat exchange zone is varied in response to the specific gravity of said conversion products.

7. The method of claim 5, wherein the volume of heated solid heat exchange material in said second portion of said second heat exchange zone is varied in response to the concentration of unsaturated material in said conversion products.

8. The method of claim 5, wherein the volume of heated solid heat exchange material in said second portion of said second heat exchange zone is varied in response to the temperature of said conversion products.

9. The pebble heat exchanger of claim 1 wherein the top central portion of said second chamber is smaller in diameter than the remaining portion of said second chamber.

References Cited in the file of this patent

UNITED STATES PATENTS

| Number | Name | Date |
|---|---|---|
| 2,080,221 | De Florez | May 11, 1937 |
| 2,416,214 | Payne | Feb. 18, 1947 |
| 2,432,873 | Ferro et al. | Dec. 16, 1947 |
| 2,486,627 | Arnold | Nov. 1, 1949 |
| 2,490,336 | Crowley | Dec. 6, 1949 |
| 2,492,958 | Bland | Jan. 3, 1950 |
| 2,513,294 | Eastwood et al. | July 4, 1950 |
| 2,518,307 | Groebe | Aug. 8, 1950 |
| 2,530,274 | Weber | Nov. 14, 1950 |
| 2,558,769 | McKinney | July 3, 1951 |